US012388969B1

(12) United States Patent
Strandborg et al.

(10) Patent No.: US 12,388,969 B1
(45) Date of Patent: Aug. 12, 2025

(54) OFFSET PIXEL ROWS FOR AUTOSTEREOSCOPIC DISPLAYS

(71) Applicant: Distance Technologies Oy, Helsinki (FI)

(72) Inventors: Mikko Strandborg, Hangonkylä (FI); Harri Kapanen, Helsinki (FI); Ville Vehkaperä, Oulu (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/177,042

(22) Filed: Apr. 11, 2025

(51) Int. Cl.
*H04N 13/305* (2018.01)
*H04N 13/366* (2018.01)
*H04N 13/398* (2018.01)

(52) U.S. Cl.
CPC ......... *H04N 13/305* (2018.05); *H04N 13/366* (2018.05); *H04N 13/398* (2018.05)

(58) Field of Classification Search
CPC .. H04N 13/305; H04N 13/317; H04N 13/324; H04N 13/31; H04N 13/398; H04N 13/351; H04N 13/366; H04N 13/302; H04N 13/376; H04N 13/349; H04N 13/383; H04N 13/315; G02B 30/27; G02B 30/29; G02B 30/30; G02B 27/0093; G02B 30/31; G02B 30/32
See application file for complete search history.

(56) References Cited

U.S. PATENT DOCUMENTS

| | | | |
|---|---|---|---|
| 2014/0340390 A1* | 11/2014 | Lanman | G02B 27/017 345/589 |
| 2019/0297317 A1* | 9/2019 | Lam | H04N 13/32 |
| 2022/0026734 A1* | 1/2022 | Clarke | G02F 1/133502 |

* cited by examiner

*Primary Examiner* — Farhan Mahmud
(74) *Attorney, Agent, or Firm* — Ziegler IP Law Group LLC.

(57) ABSTRACT

An autostereoscopic display includes a pixel array and a multiscopic optical element. The pixel array includes a plurality of pixel rows, each of the plurality of pixel rows being aligned along an X-axis of the autostereoscopic display. The multiscopic optical element comprises a plurality of multiscopic cells (108) and lies on an XY plane of the autostereoscopic display. Each of the plurality of multiscopic cells has a longitudinal axis (P-Q) aligned along a Y-axis of the autostereoscopic display. In a given set of consecutive pixel rows, a starting position of a given pixel row is horizontally offset relative to a starting position of a preceding pixel row. The horizontal offset is represented along the X-axis.

15 Claims, 3 Drawing Sheets

OFFSET PIXEL ROWS FOR AUTOSTEREOSCOPIC DISPLAYS

TECHNICAL FIELD

The present disclosure relates to autostereoscopic displays having offset pixel rows. The present disclosure further relates to systems having autostereoscopic displays with offset pixel rows. The present disclosure also relates to methods for displaying images via autostereoscopic displays having offset pixel rows.

BACKGROUND

Autostereoscopic displays provide three-dimensional (3D) visualization of images without requiring specialized eyewear. As a result, the autostereoscopic displays are increasingly used in automotive head-up displays (HUDs), augmented reality (AR) systems, and other display applications requiring 3D visualization of images.

Conventional autostereoscopic displays typically employ multiscopic optical elements such as lenticular arrays or parallax barriers. The multiscopic optical elements are arranged in optical alignment with pixel arrays. The multiscopic optical elements direct distinct portions of the image toward different viewing angles to generate a perception of depth. Further, interaction between a periodic structure of the multiscopic optical elements and the pixel array may result in visible artifacts, including Moiré patterns.

Further, geometric mismatch between pixel rows and the multiscopic optical elements may cause directional variation in emitted light across the pixel array. The directional variation in emitted light may lead to overlap between light emitted from adjacent pixels, increasing crosstalk between adjacent pixels and reducing separation between viewing zones.

The increased crosstalk and reduced separation between viewing zones limit brightness, reduce effective image resolution, and degrade accuracy of depth presentation in the autostereoscopic display.

Therefore, there exists a need to reduce visible artifacts in autostereoscopic displays while preserving image quality, depth separation, and brightness without increasing manufacturing complexity of the autostereoscopic displays.

SUMMARY

The present disclosure seeks to provide an autostereoscopic display having offset pixel rows, a system having the autostereoscopic display with offset pixel rows, and a method for displaying images via the autostereoscopic display having the offset pixel rows. The aim of the present disclosure is achieved by the autostereoscopic display, the system comprising the autostereoscopic display and an optical combiner, and the method for displaying images via the autostereoscopic display, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides autostereoscopic display comprising:
 a pixel array comprising a plurality of pixel rows, each of the plurality of pixel rows being aligned along an X-axis of the autostereoscopic display; and
 a multiscopic optical element comprising a plurality of multiscopic cells, the multiscopic optical element lying on an XY plane of the autostereoscopic display, each of the plurality of multiscopic cells having a longitudinal axis aligned along a Y axis of the autostereoscopic display,
 wherein in a given set of consecutive pixel rows, a starting position of a given pixel row is horizontally offset relative to a starting position of a preceding pixel row, the horizontal offset being represented along the X-axis.

In a second aspect, the present disclosure provides a system comprising:
 the autostereoscopic display of the first aspect;
 an optical combiner arranged on an optical path of the autostereoscopic display and on an optical path of a real-world light field of a real-world environment; and
 at least one processor configured to:
  generate an image to be displayed via the autostereoscopic display, based on respective horizontal offsets between consecutive pixel rows in the autostereoscopic display; and
  display the image via the autostereoscopic display, for producing a synthetic light field,
 wherein the optical combiner is employed to reflect the synthetic light field towards eyes of at least one user, whilst optically combining the real-world light field with the synthetic light field.

In a third aspect, the present disclosure provides a method comprising:
 generating an image to be displayed via an autostereoscopic display, wherein autostereoscopic display comprises a pixel array comprising a plurality of pixel rows, and a multiscopic optical element comprising a plurality of multiscopic cells, each of the plurality of pixel rows being aligned along an X-axis of the autostereoscopic display, the multiscopic optical element lying on an XY plane of the autostereoscopic display, each of the plurality of multiscopic cells having a longitudinal axis aligned along a Y axis of the autostereoscopic display, wherein in a given set of consecutive pixel rows, a starting position of a given pixel row is horizontally offset relative to a starting position of a preceding pixel row, the horizontal offset being represented along the X-axis, wherein the image is generated based on respective horizontal offsets between consecutive pixel rows in the autostereoscopic display;

displaying the image via the autostereoscopic display, for producing a synthetic light field; and reflecting the synthetic light field towards eyes of at least one user, whilst optically combining a real-world light field of a real-world environment with the synthetic light field, by using an optical combiner arranged on an optical path of the autostereoscopic display and on an optical path of the real-world light field.

The present disclosure provides the autostereoscopic display, the system, and the method for displaying images using the autostereoscopic display. The autostereoscopic display comprises the pixel array and the multiscopic optical element comprising the plurality of multiscopic cells. The multiscopic optical element lies on an XY plane of the autostereoscopic display, and each of the plurality of multiscopic cells has the longitudinal axis aligned along the Y-axis of the autostereoscopic display. The autostereoscopic display enables emission of light towards the individual eyes of the at least one user by horizontally offsetting a starting position of a given pixel row relative to a starting position of a preceding pixel row in a given set of consecutive pixel rows. The system comprises the autostereoscopic display and the optical combiner arranged on the optical path of the autostereoscopic display and on the optical path of the real-world light field of the real-world environment. The method comprises generating the image based on respective horizontal offsets between consecutive pixel rows in the autostereoscopic display and displaying the image via the autostereoscopic display for producing the synthetic light field. The system and the method facilitate directional emission of light, increase brightness by allowing the entire height of each pixel to contribute to a given viewing direction, allow use of lower resolution displays and larger pixel sizes while retaining resolution, reduce crosstalk between different parts of images directed towards individual eyes of the at least one user, and allow integration of displayed images with the real-world light field via the optical combiner.

The autostereoscopic display comprises the pixel array comprising the plurality of pixel rows. The term "pixel row" refers to a horizontal arrangement of pixels within the pixel array, wherein the horizontal arrangement extends along the X-axis. Each of the plurality of pixel rows is aligned along the X-axis of the autostereoscopic display. The alignment of the plurality of pixel rows along the X-axis facilitates consistent structuring of the pixels along a horizontal direction of the autostereoscopic display. The alignment of the plurality of pixel rows along the X-axis provides a technical benefit of enabling consistent directional emission of light along the X-axis, contributing to reduction in overlap of the emitted light between adjacent pixels. The reduction in the overlap of the emitted light between adjacent pixels provides a technical benefit of improving directing of different parts of images towards individual eyes of at least one user, and improving brightness and resolution characteristics of the autostereoscopic display.

The autostereoscopic display further comprises the multiscopic optical element comprising the plurality of multiscopic cells. The term "multiscopic optical element" as used throughout the present disclosure refers to an optical element configured to direct different parts of images towards individual eyes of at least one user. The multiscopic optical element lies on the XY plane of the autostereoscopic display. The term "multiscopic cell" as used throughout the present disclosure refers to a lenticular lens of a lenticular array, a lenticular lens of an individual lenticular array in a directional backlight employing dual lenticular arrays, or a transparent slit of a parallax barrier. Each of the plurality of multiscopic cells has the longitudinal axis aligned along the Y-axis of the autostereoscopic display. In the given set of consecutive pixel rows, the starting position of the given pixel row is horizontally offset relative to the starting position of the preceding pixel row, the horizontal offset being represented along the X-axis. The term "horizontal offset" as used throughout the present disclosure refers to a displacement along the X-axis of the autostereoscopic display, wherein each of the plurality of pixel rows is aligned along the X-axis. The horizontal offset is either rightward or leftward. The horizontal offset between the starting positions of the consecutive pixel rows provides a technical benefit of contributing to reduction in overlap of the emitted light between adjacent pixels. The arrangement of the plurality of multiscopic cells aligned along the Y-axis, in combination with the horizontal offset of the pixel rows, provides a technical benefit of facilitating consistent directional emission of light from each pixel along the Y-axis of the autostereoscopic display. The arrangement of the plurality of multiscopic cells aligned along the Y-axis, along with the horizontal offset of the pixel rows, provides a technical benefit of improving directing of different parts of images towards individual eyes of at least one user. The arrangement further provides a technical benefit of improving brightness while maintaining resolution characteristics of the autostereoscopic display.

Optionally, a horizontal offset between starting positions of successive pixel rows follows a progressive linear pattern. Further, a starting position of a pixel row is horizontally offset by a predefined distance relative to a starting position of a preceding pixel row. The progressive linear pattern allows consistent variation in the horizontal offset along the X-axis, facilitating alignment of the starting positions of the pixel rows relative to the plurality of multiscopic cells of the multiscopic optical element. The predefined distance between the starting positions of the successive pixel rows facilitates uniform positioning of the pixel rows with respect to the plurality of multiscopic cells. The arrangement comprising the progressive linear pattern and the predefined distance provides a technical benefit of contributing to reduction in overlap of emitted light between adjacent pixels, improving directing different parts of images towards individual eyes of at least one user, and improving brightness and resolution characteristics of the autostereoscopic display.

Optionally, the predefined distance is equal to a product of a pixel width and a tangent of a predefined angle, the predefined angle being in a range of 5 degrees to 10 degrees. The selection of the predefined angle in the range of 5 degrees to 10 degrees provides a technical benefit of the horizontal offset between the starting positions of the consecutive pixel rows to reduce visibility of interference patterns caused by interaction between the pixel array and the multiscopic optical element. In particular, when the predefined angle is greater than or equal to 6 degrees, such as, 6 degrees, 7 degrees, 8 degrees, 9 degrees or 10 degrees, the interference patterns are no longer visible to the at least one user. The predefined distance derived from the tangent of the predefined angle facilitates consistent placement of the starting positions of the pixel rows relative to the plurality of multiscopic cells, providing a technical benefit of contributing to reduction in overlap of emitted light between adjacent pixels, improving directing different parts of images towards individual eyes of at least one user, and improving brightness and resolution characteristics of the autostereoscopic display.

Optionally, for an $N^{th}$ pixel row in the given set of consecutive pixel rows, if a product of (N−1) and the predefined distance exceeds the pixel width, a starting position of the $N^{th}$ pixel row is horizontally offset by a secondary distance relative to a starting position of a first pixel row in the given set of consecutive pixel rows, wherein the secondary distance is equal to a remainder of the product modulo the pixel width. A starting position of a pixel row is horizontally offset by the predefined distance from a preceding pixel row. The horizontal offset by the predefined distance provides a technical benefit of maintaining the starting positions of the pixel rows within a range defined by the pixel width without shifting indefinitely. However, if the cumulative horizontal offset exceeds the pixel width, the starting position is constrained within a range defined by one pixel width. The application of the modulo operation to the cumulative horizontal offset provides a technical benefit of preventing the starting positions of the pixel rows from shifting continuously across multiple pixel widths. The horizontal constraint based on the pixel width maintains the starting positions of the pixel rows within a range defined by the pixel width, and providing a technical benefit of keeping the horizontal offset pattern periodic. The use of the modulo operation further provides a technical benefit of maintaining alignment with the pixel array of the autostereoscopic display and provides a technical benefit of contributing to reduction in overlap of emitted light between adjacent pixels, improving directing different parts of images towards individual eyes of at least one user, and improving brightness and resolution characteristics of the autostereoscopic display.

Optionally, a horizontal offset between starting positions of pixel rows follows a predefined pseudorandom sequence. Further, a starting position of a pixel row is horizontally offset by a pseudorandom distance relative to a starting position of a preceding pixel row. The term "predefined pseudorandom sequence" refers to a known sequence that can be reproduced for different sets of consecutive pixel rows. The use of the predefined pseudorandom sequence for determining the horizontal offsets provides a technical benefit of avoiding periodic or repeating patterns in the placement of the starting positions of the pixel rows. The absence of a repeating horizontal offset pattern prevents the formation of interference patterns between the pixel array and the multiscopic optical element, providing a technical benefit of reducing aliasing effects. The variation in the horizontal offset according to the predefined pseudorandom sequence provides a technical benefit of contributing to reduction in overlap of emitted light between adjacent pixels, improving directing different parts of images towards individual eyes of at least one user, and improving brightness and resolution characteristics of the autostereoscopic display.

Optionally, the given set of consecutive pixel rows comprises more than five pixel rows. The use of more than five pixel rows in the given set provides a technical benefit of reducing a likelihood of introducing aliasing effects that may occur when the horizontal offset pattern repeats with a short interval. A short sequence of horizontal offsets, such as those repeating after three or four pixel rows, may lead to interference patterns between the pixel array and the multiscopic optical element. Further, increasing the number of pixel rows in the given set extends a length of the horizontal offset pattern, reducing regularity in the placement of the starting positions of the pixel rows and providing a technical benefit of minimizing aliasing effects. The increased variation in horizontal offsets across the given set provides a technical benefit of contributing to reduction in overlap of emitted light between adjacent pixels, improving directing different parts of images towards individual eyes of at least one user, and improving brightness and resolution characteristics of the autostereoscopic display.

Optionally, the horizontal offset is at least 0.1 times the pixel width. For example, 0.1 times the pixel width corresponds to approximately 0.3 times the sub-pixel width when a single pixel comprises three sub-pixels. A horizontal offset of at least 0.1 times the pixel width provides sufficient horizontal separation between the starting positions of consecutive pixel rows to prevent sub-pixel alignment that may contribute to interference patterns. The use of a horizontal offset of at least 0.1 times the pixel width provides a technical benefit of standardizing the offset range to support reduction of Moiré patterns and enhance performance of the multiscopic optical element. The increased horizontal offset provides a technical benefit of improving variation in directional emission across pixel rows, and provides a technical benefit of contributing to reduction in overlap of emitted light between adjacent pixels. The magnitude of separation provides a technical benefit of improving directing different parts of images towards individual eyes of at least one user, and improving brightness and resolution characteristics of the autostereoscopic display.

Optionally, the horizontal offset is at most 0.3 times the pixel width. The selection of an upper limit for the horizontal offset in the range of up to 0.3 times the pixel width provides a technical benefit of ensuring compatibility with predefined pseudorandom sequences used for determining starting positions of the pixel rows. While the horizontal offset is calculated modulo the pixel width, defining the upper limit provides a technical benefit of maintaining consistent alignment of pixel row alignment relative to the pixel grid. For example, when the horizontal offset exceeds approximately 0.333 times the pixel width, the resulting position may correspond to a negative offset relative to the pixel grid due to the modulo operation. The upper limit thereby provides a technical benefit of enabling clear interpretation of offset positions within the pixel array. The defined range for the horizontal offset provides a technical benefit of contributing to reduction in overlap of emitted light between adjacent pixels, improving directing different parts of images towards individual eyes of at least one user, and improving brightness and resolution characteristics of the autostereoscopic display.

Optionally, the autostereoscopic display further comprises a processor configured to:
  generate drive signals for the pixel array, based on an image to be displayed and respective horizontal offsets between consecutive pixel rows; and
  drive the pixel array using the drive signals to display the image.

The processor generates the drive signals based on the respective horizontal offsets, providing a technical benefit of aligning the image to be aligned with the placement of the pixel rows. The generation and application of drive signals that account for the horizontal offsets provide a technical benefit of accurately aligning the image with the pixel array, thereby contributing to reduction in overlap of the emitted light between adjacent pixels. The alignment of the image with the offset placement of the pixel rows through the operation of the processor provides a technical benefit of improving directing different parts of images towards individual eyes of at least one user, and improving brightness and resolution characteristics of the autostereoscopic display.

Optionally, the processor is configured to generate or retrieve the image, based on the respective horizontal offsets between the consecutive pixel rows. The generation or retrieval of the image based on the respective horizontal offsets provides a technical benefit of aligning the image with the placement of the pixel rows. The incorporation of the horizontal offsets into the image processing provides a technical benefit of accurately aligning the image with the multiscopic optical element. The alignment between the image and the respective horizontal offsets between the starting positions of the pixel rows provides a technical benefit of reducing overlap of the emitted light between adjacent pixels, improving directing different parts of images towards individual eyes of at least one user, and improving brightness and resolution characteristics of the autostereoscopic display.

The system comprises the autostereoscopic display and the optical combiner arranged on the optical path of the autostereoscopic display and on the optical path of the real-world light field of the real-world environment. The term "optical combiner" as used throughout the present disclosure refers to an optical element employed to reflect the synthetic light field towards eyes of the at least one user while optically combining the real-world light field with the synthetic light field. The term "optical path" refers to a direction of light propagation from a source to an observer through one or more optical elements. The arrangement of the optical combiner on both the optical path of the autostereoscopic display and the optical path of the real-world light field provides a technical benefit of allowing the system to direct the synthetic light field toward the eyes of the at least one user while maintaining visibility of the real-world environment. The term "real-world light field" as used throughout the present disclosure refers to light originating from the real-world environment that propagates along multiple directions and reaches the eyes of the at least one user, allowing perception of depth and spatial relationships of real-world objects. The term "synthetic light field" as used throughout the present disclosure refers to perception of depth and perspective generated by the autostereoscopic display based on a relative location of eyes of the at least one user with respect to each other. The combination of the synthetic light field and the real-world light field provides a technical benefit of allowing integration of displayed image with the real-world environment. The system thereby provides a technical benefit of enabling use in applications such as HUDs, where visibility of the real-world environment and displayed image must coexist. The inclusion of the autostereoscopic display within the system allows the system to provide the technical benefits provided by the autostereoscopic display, including reduction in overlap of emitted light between adjacent pixels and improvement in directing different parts of images towards individual eyes of at least one user, as well as improvement in brightness and resolution characteristics.

The system further comprises at least one processor configured to generate the image to be displayed via the autostereoscopic display, based on respective horizontal offsets between consecutive pixel rows in the autostereoscopic display and display the image via the autostereoscopic display, for producing the synthetic light field. The optical combiner is employed to reflect the synthetic light field towards eyes of at least one user, whilst optically combining the real-world light field with the synthetic light field. The generation of the image based on the respective horizontal offsets provides a technical benefit of aligning the image with the placement of the pixel rows of the autostereoscopic display, thereby enabling accurate directional emission of light. The display of the image via the autostereoscopic display produces the synthetic light field that corresponds to the horizontal offsets between the consecutive pixel rows defined by the horizontal offsets. The optical combiner reflects the synthetic light field towards the at least one user while simultaneously allowing transmission of the real-world light field, thereby providing a technical benefit of enabling the at least one user to view both displayed image and the real-world environment. The use of the optical combiner in combination with the autostereoscopic display provides a technical benefit of allowing integration of the synthetic light field with the real-world light field, supporting applications requiring transparency and alignment with the placement of the pixel rows. The configuration of the system provides a technical benefit of reducing overlap of emitted light between adjacent pixels, improving directing different parts of images towards individual eyes of at least one user, and improving brightness and resolution characteristics of the displayed content.

Optionally, the system further comprises an eye tracker, wherein the at least one processor is configured to determine a relative location of a first eye and of a second eye of the at least one user with respect to the optical combiner, using the eye tracker, wherein the image is generated based on the relative location of the first eye and of the second eye of the at least one user with respect to the optical combiner.

The term "relative location of the first eye and of the second eye" refers to a positional relationship between each eye of the at least one user and the optical combiner through which the synthetic light field and the real-world light field are viewed. The determination of the relative location of the first eye and of the second eye provides a technical benefit of enabling the image to be generated such that the synthetic light field is aligned with the viewing perspective of the at least one user through the optical combiner. The alignment of the synthetic light field with the viewing perspective of the at least one user through the optical combiner provides a technical benefit of enabling the synthetic light field to maintain consistency with the position of the at least one user, allowing accurate directional emission of light. The configuration comprising the eye tracker provides a technical benefit of reducing overlap of emitted light between adjacent pixels, improving directing different parts of images towards individual eyes of at least one user, improving brightness and resolution characteristics of the system, and maintaining alignment with the viewing position of the at least one user.

The present disclosure further relates to the method as described above. Various embodiments and variants disclosed above with respect to the system described in the first aspect, apply mutatis mutandis to the method in the second aspect.

Optionally, the method further comprises determining a relative location of a first eye and of a second eye of the at least one user with respect to the optical combiner, using an eye tracker, wherein the step of generating the image is performed based on the relative location of the first eye and of the second eye of the at least one user with respect to the optical combiner.

A key technical benefit of determining the relative location of the first eye and of the second eye of the at least one user with respect to the optical combiner and generating the image based on the determined relative location is improved alignment of the synthetic light field with the viewing perspective of the at least one user. The use of the eye tracker to determine the relative location of the first eye and of the second eye allows accurate alignment of the image with the optical combiner, enabling the image to be reflected accurately towards the eyes of the at least one user. The alignment of the generated image with the detected viewing perspective facilitates consistent directional emission of light, reduces misalignment due to movement of the at least one user, and contributes to reduction in overlap of emitted light between adjacent pixels, thereby improving directing different parts of images towards individual eyes of at least one user, as well as improving brightness and resolution characteristics of the displayed image.

Optionally, the method further comprises:
generating drive signals for the pixel array, based on an image to be displayed and respective horizontal offsets between consecutive pixel rows; and
driving the pixel array using the drive signals to display the image.

A key technical benefit of generating the drive signals based on the image to be displayed and the respective horizontal offsets between consecutive pixel rows and driving the pixel array using the drive signals is improved alignment between the image and the placement of the pixel rows. The generation of the drive signals based on the horizontal offsets allows accurate control of directional emission of light from the pixel rows. The driving of the pixel array using the generated drive signals contributes to reduction in overlap of emitted light between adjacent pixels, thereby improving directing different parts of images towards individual eyes of at least one user, as well as improving brightness and resolution characteristics of the autostereoscopic display.

Optionally, the method further comprises horizontally offsetting starting positions of successive pixels rows. A horizontal offset between starting positions of successive pixel rows follows a progressive linear pattern, wherein a starting position of a pixel row is horizontally offset by a predefined distance relative to a starting position of a preceding pixel row. A key technical benefit of implementing a horizontal offset between starting positions of successive pixel rows that follows a progressive linear pattern, and horizontally offsetting a starting position of a pixel row by a predefined distance relative to a starting position of a preceding pixel row, is improved alignment of the image with the plurality of multiscopic cells of the multiscopic optical element. The use of the progressive linear pattern enables uniform variation in the placement of the starting positions, which facilitates consistent directional emission of light across the pixel rows. The resulting alignment contributes to reduction in overlap of emitted light between adjacent pixels and allows improvement in directing different parts of images towards individual eyes of at least one user, as well as improvement in brightness and resolution characteristics of the autostereoscopic display.

Optionally, the method further comprises determining the predefined distance to be used in generating the image within a given range. The predefined distance is equal to a product of a pixel width and a tangent of a predefined angle, the predefined angle being in a range of 5 degrees to 10 degrees. A key technical benefit of using a predefined distance equal to a product of a pixel width and a tangent of a predefined angle, where the predefined angle is in a range of 5 degrees to 10 degrees, is suppression of interference patterns that may arise due to interaction between the pixel array and the multiscopic optical element. The calculation of the predefined distance based on the tangent of the predefined angle allows the horizontal offsets to align with the angular placement of the plurality of multiscopic cells. The alignment reduces the visibility of interference patterns and facilitates directional consistency in emission of light across the pixel rows. The resulting configuration contributes to reduction in overlap of emitted light between adjacent pixels and enables improvement in directing different parts of images towards individual eyes of at least one user, as well as improvement in brightness and resolution characteristics of the autostereoscopic display.

Optionally, the method further comprises horizontally offsetting a starting position of a given pixel row by a given distance. For an $N^{th}$ pixel row in the given set of consecutive pixel rows, if a product of (N−1) and the predefined distance exceeds the pixel width, a starting position of the $N^{th}$ pixel row is horizontally offset by a secondary distance relative to a starting position of a first pixel row in the given set of consecutive pixel rows, wherein the secondary distance is equal to a remainder of the product modulo the pixel width. A key technical benefit of offsetting the starting position of the Nth pixel row by a secondary distance relative to the starting position of a first pixel row, wherein the secondary distance is equal to a remainder of the product modulo the pixel width, is preservation of a periodic horizontal offset pattern across the pixel array. The use of the modulo operation prevents cumulative horizontal offsets from exceeding the pixel width, thereby avoiding indefinite shift in the placement of the pixel rows. The application of the modulo operation to the horizontal offset maintains the placement of the starting positions of the pixel rows within a range defined by the pixel width and allows alignment of the image with the plurality of multiscopic cells of the multiscopic optical element. The resulting configuration contributes to reduction in overlap of emitted light between adjacent pixels and enables improvement in directing different parts of images towards individual eyes of at least one user, as well as improvement in brightness and resolution characteristics of the autostereoscopic display.

Optionally, the method further comprises selecting the horizontal offset to follow a given sequence. The horizontal offset between starting positions of pixel rows follows a predefined pseudorandom sequence, wherein a starting position of a pixel row is horizontally offset by a pseudorandom distance relative to a starting position of a preceding pixel row. A key technical benefit of implementing the horizontal offset between starting positions of pixel rows based on the predefined pseudorandom sequence, wherein each starting position is offset by a pseudorandom distance relative to the preceding pixel row, is reduction of aliasing effects resulting from periodic patterns. The use of the predefined pseudorandom sequence eliminates regular variation in the placement of the starting positions of the pixel rows, thereby preventing the formation of interference patterns. The absence of the repeating offset pattern across the pixel rows contributes to reduction in overlap of emitted light between adjacent pixels and enables improvement in directing different parts of images towards individual eyes of at least one user, as well as improvement in brightness and resolution characteristics of the autostereoscopic display.

Optionally, the method further comprises selecting the given set of consecutive pixel rows to comprise multiple pixel rows within a given range. The given set of consecutive pixel rows comprises more than five pixel rows. A key technical benefit of using a given set of consecutive pixel rows comprising more than five pixel rows is reduction of aliasing effects that may arise from repeating horizontal offset sequences of short length. The inclusion of more than five pixel rows in the given set prevents the horizontal offset pattern from repeating at short intervals, which could otherwise lead to interference patterns. The increased variation in the placement of starting positions across the extended set of pixel rows contributes to reduction in overlap of emitted light between adjacent pixels and enables improvement in directing different parts of images towards individual eyes of at least one user, as well as improvement in brightness and resolution characteristics of the autostereoscopic display.

Optionally, the method further comprises selecting the horizontal offset to be within a given range. The horizontal offset is at least 0.1 times the pixel width. A key technical benefit of implementing a horizontal offset that is at least 0.1 times the pixel width is prevention of alignment conditions across successive pixel rows that may lead to interference patterns. The magnitude of the horizontal offset provides sufficient separation between the starting positions of the pixel rows to introduce directional variation in emission of light, thereby disrupting alignment patterns that typically contribute to visible artifacts. The resulting variation across the pixel rows contributes to reduction in overlap of emitted light between adjacent pixels and enables improvement in directing different parts of images towards individual eyes of at least one user, as well as improvement in brightness and resolution characteristics of the autostereoscopic display.

Optionally, the method further comprises selecting the horizontal offset to be within a separate given range. The horizontal offset is at most 0.3 times the pixel width. A key technical benefit of implementing a horizontal offset that is at most 0.3 times the pixel width is preservation of alignment between the starting positions of the pixel rows and the pixel array. The limitation on the maximum horizontal offset value supports compatibility with predefined pseudorandom sequences used for determining horizontal offsets and prevents offset values from exceeding the range defined by the pixel width. The constraint on the range of the horizontal offset facilitates predictable placement across the pixel rows, contributing to reduction in overlap of emitted light between adjacent pixels and enabling improvement in directing different parts of images towards individual eyes of at least one user, as well as improvement in brightness and resolution characteristics of the autostereoscopic display.

DETAILED DESCRIPTION OF THE DRAWINGS

Figure 1:
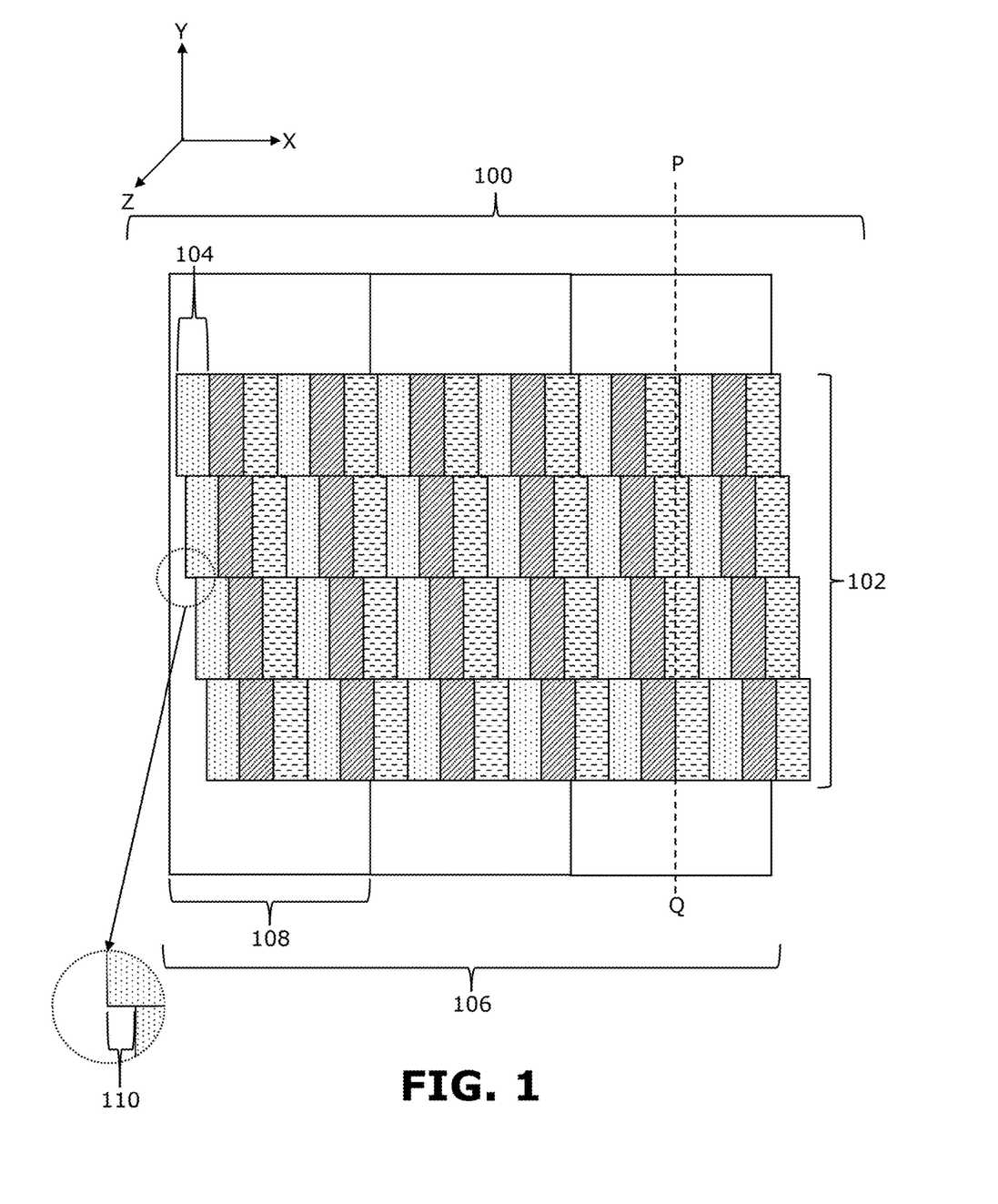
FIG. 1 shows a simplified top view of an autostereoscopic display in a first aspect, in accordance with another embodiment of the present disclosure.

FIG. 1 shows a simplified top view of an autostereoscopic display 100 in a first aspect, in accordance with an embodiment of the present disclosure. The autostereoscopic display 100 comprises a pixel array 102 comprising a plurality of pixel rows 104. Each of the plurality of pixel rows 104 is aligned along an X-axis of the autostereoscopic display 100. The X-, Y- and Z-axes of the autostereoscopic display 100 is displayed on top-left corner of FIG. 1. The autostereoscopic display 100 further comprises a multiscopic optical element 106 comprising a plurality of multiscopic cells 108. As shown, the plurality of multiscopic cells comprise three individual, identical multiscopic cells 108 arranged adjacent to each other. The multiscopic optical element 106 lies on an XY plane of the autostereoscopic display 100. Each of the plurality of multiscopic cells 108 has a longitudinal axis P-Q aligned along a Y axis of the autostereoscopic display 100.

Further, in a given set of consecutive pixel rows, a starting position of a given pixel row is horizontally offset 110 relative to a starting position of a preceding pixel row. The horizontal offset 110 is represented along the X-axis. A zoomed-in view of edges of two consecutive pixel rows 104 has been shown in a bottom left corner of FIG. 1 to clearly illustrate the horizontal offset 110. A portion of the edges of the two consecutive pixel rows 104 that has been zoomed-in has been encircled with a small dotted circle. Further, a bigger dotted circle has been used to illustrate the zoomed-in view of the same two consecutive pixel rows 104. A solid arrow connecting the small dotted circle and the bigger dotted circle has only been used to indicate that the two dotted circles show a same portion of the autostereoscopic display 100.

Figure 2:
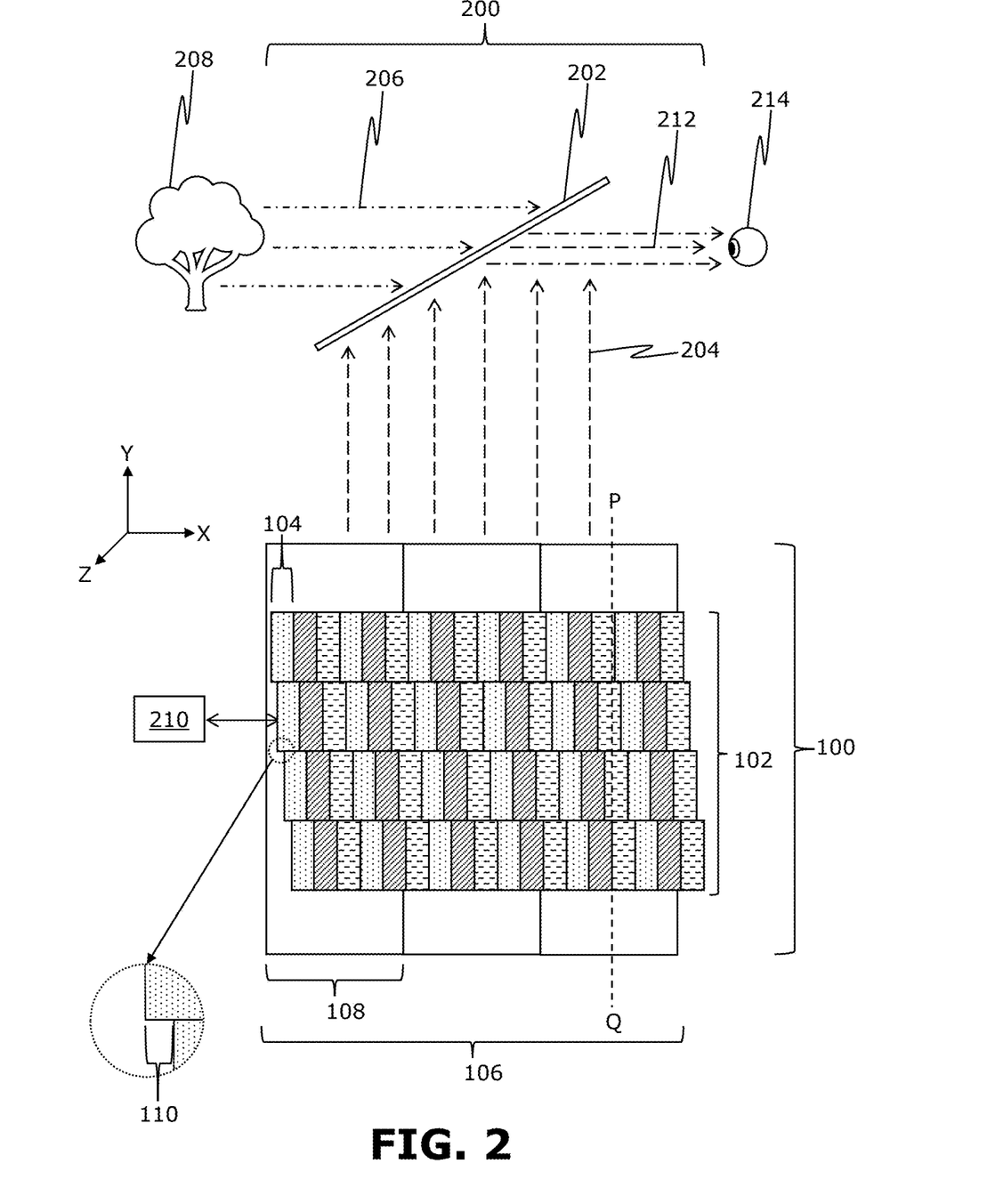
FIG. 2 shows a simplified view of an exemplary system in a second aspect, in accordance with an embodiment of the present disclosure.

FIG. 2 shows a simplified view of an exemplary system 200 in a second aspect, in accordance with an embodiment of the present disclosure. The system 200 comprises the autostereoscopic display 100 of FIG. 1 and an optical combiner 202 arranged on an optical path 204 (indicated using long-dashed arrows) of the autostereoscopic display 100 and on an optical path 206 (indicated using dash-dot arrows) of a real-world light field of a real-world environment 208. The system 200 further comprises at least one processor 210 configured to:

generate an image to be displayed via the autostereoscopic display 100, based on respective horizontal offsets 112 between consecutive pixel rows 104 in the autostereoscopic display 100; and display the image via the autostereoscopic display 100, for producing a synthetic light field 212 (illustrated using long-dash and dotted arrows), wherein the optical combiner 202 is employed to reflect the synthetic light field 212 towards eyes 214 of at least one user, whilst optically combining the real-world light field with the synthetic light field 212.

Figure 3:
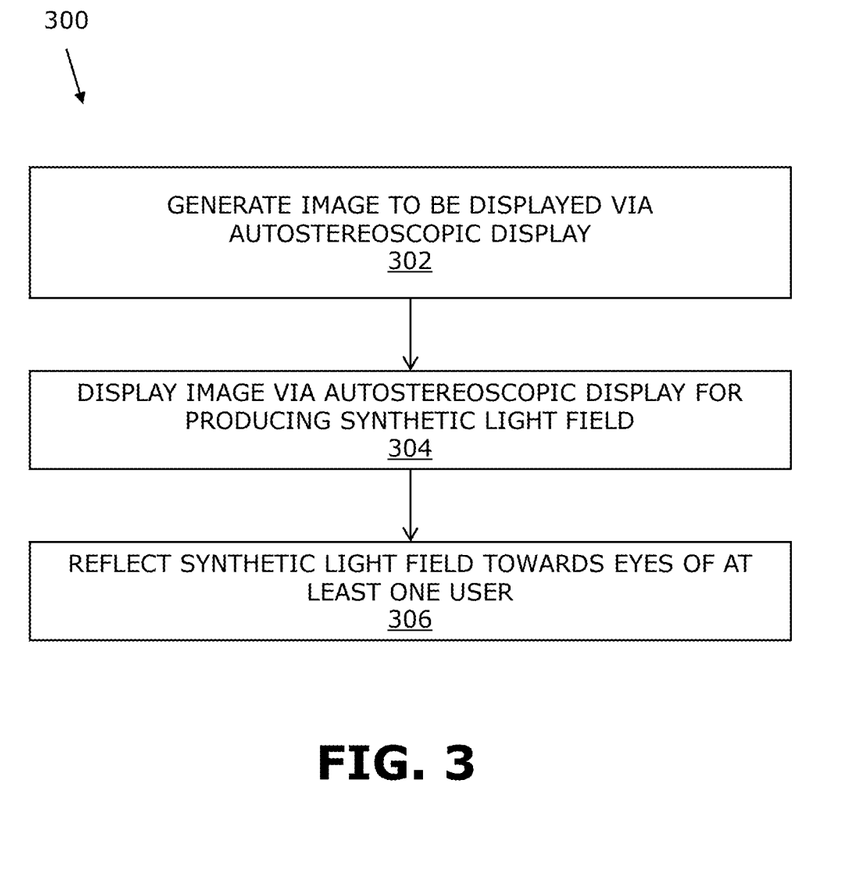
FIG. 3 shows steps of a method in a third aspect, in accordance with an embodiment of the present disclosure.

FIG. 3 shows steps of a method 300 in a third aspect, in accordance with an embodiment of the present disclosure. At step 302, an image to be displayed via an autostereoscopic display is generated. The autostereoscopic display comprises a pixel array comprises a plurality of pixel rows, and a multiscopic optical element comprising a plurality of multiscopic cells. Each of the plurality of pixel rows is aligned along an X-axis of the autostereoscopic display. The multiscopic optical element lies on an XY plane of the autostereoscopic display. Each of the plurality of multiscopic cells has a longitudinal axis aligned along a Y axis of the autostereoscopic display. Further, in a given set of consecutive pixel rows, a starting position of a given pixel row is horizontally offset relative to a starting position of a preceding pixel row. The horizontal offset is represented along the X-axis. The image is generated based on respective horizontal offsets between consecutive pixel rows in the autostereoscopic display. At step 304, the image is displayed via the autostereoscopic display, for producing a synthetic light field. At step 306, the synthetic light field is reflected towards eyes of at least one user, whilst optically combining the synthetic light field with a real-world light field of a real-world environment, by using an optical combiner arranged on an optical path of the autostereoscopic display and on an optical path of the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. An autostereoscopic display comprising:
   a pixel array comprising a plurality of pixel rows, each of the plurality of pixel rows being aligned along an X-axis of the autostereoscopic display; and
   a multiscopic optical element comprising a plurality of multiscopic cells, the multiscopic optical element lying on an XY plane of the autostereoscopic display, each of the plurality of multiscopic cells having a longitudinal axis (P-Q) aligned along a Y axis of the autostereoscopic display,
   wherein in a given set of consecutive pixel rows, a starting position of a given pixel row is horizontally offset relative to a starting position of a preceding pixel row, the horizontal offset being represented along the X-axis.

2. The autostereoscopic display of claim 1, wherein a horizontal offset between starting positions of successive pixel rows follows a progressive linear pattern, wherein a starting position of a pixel row is horizontally offset by a predefined distance relative to a starting position of a preceding pixel row.

3. The autostereoscopic display of claim 2, wherein the predefined distance is equal to a product of a pixel width and a tangent of a predefined angle, the predefined angle being in a range of 5 degrees to 10 degrees.

4. The autostereoscopic display of claim 2, wherein for an $N^{th}$ pixel row in the given set of consecutive pixel rows, if a product of (N−1) and the predefined distance exceeds the pixel width, a starting position of the $N^{th}$ pixel row is horizontally offset by a secondary distance relative to a starting position of a first pixel row in the given set of consecutive pixel rows, wherein the secondary distance is equal to a remainder of the product modulo the pixel width.

5. The autostereoscopic display of claim 1, wherein a horizontal offset between starting positions of pixel rows follows a predefined pseudorandom sequence, wherein a starting position of a pixel row is horizontally offset by a pseudorandom distance relative to a starting position of a preceding pixel row.

6. The autostereoscopic display of claim 1, wherein the given set of consecutive pixel rows comprises more than five pixel rows.

7. The autostereoscopic display of claim 1, wherein the horizontal offset is at least 0.1 times the pixel width.

8. The autostereoscopic display of claim 1, wherein the horizontal offset is at most 0.3 times the pixel width.

9. The autostereoscopic display of claim 1, further comprising a processor configured to:
   generate drive signals for the pixel array, based on an image to be displayed and respective horizontal offsets between consecutive pixel rows; and
   drive the pixel array using the drive signals to display the image.

10. The autostereoscopic display of claim 9, wherein the processor is configured to generate or retrieve the image, based on the respective horizontal offsets between the consecutive pixel rows (104).

11. A system comprising:
    an autostereoscopic display of claim 1;
    an optical combiner arranged on an optical path of the autostereoscopic display and on an optical path of a real-world light field of a real-world environment (208); and
    at least one processor configured to:
       generate an image to be displayed via the autostereoscopic display, based on respective horizontal offsets between consecutive pixel rows in the autostereoscopic display; and
       display the image via the autostereoscopic display, for producing a synthetic light field,
    wherein the optical combiner is employed to reflect the synthetic light field towards eyes of at least one user, whilst optically combining the real-world light field with the synthetic light field.

12. The system of claim 11, further comprising an eye tracker, wherein the at least one processor is configured to determine a relative location of a first eye and of a second eye of the at least one user with respect to the optical combiner, using the eye tracker,
    wherein the image is generated based on the relative location of the first eye and of the second eye of the at least one user with respect to the optical combiner.

13. A method comprising:
    generating an image to be displayed via an autostereoscopic display, wherein the autostereoscopic display comprises a pixel array comprising a plurality of pixel rows, and a multiscopic optical element comprising a plurality of multiscopic cells, each of the plurality of pixel rows being aligned along an X-axis of the autostereoscopic display, the multiscopic optical element lying on an XY plane of the autostereoscopic display, each of the plurality of multiscopic cells having a longitudinal axis (P-Q) aligned along a Y axis of the autostereoscopic display, wherein in a given set of consecutive pixel rows, a starting position of a given pixel row is horizontally offset relative to a starting position of a preceding pixel row, the horizontal offset being represented along the X-axis, wherein the image is generated based on respective horizontal offsets between consecutive pixel rows in the autostereoscopic display;
    displaying the image via the autostereoscopic display, for producing a synthetic light field; and
    reflecting the synthetic light field towards eyes of at least one user, whilst optically combining a real-world light field of a real-world environment with the synthetic light field, by using an optical combiner arranged on an optical path of the autostereoscopic display and on an optical path of the real-world light field.

14. The method of claim 13, further comprising determining a relative location of a first eye and of a second eye of the at least one user with respect to the optical combiner, using an eye tracker,
    wherein the step of generating the image is performed based on the relative location of the first eye and of the second eye of the at least one user with respect to the optical combiner.

15. The method of claim 13, further comprising:
    generating drive signals for the pixel array, based on an image to be displayed and respective horizontal offsets between consecutive pixel rows; and
    driving the pixel array using the drive signals to display the image.

* * * * *